US010312778B2

(12) United States Patent
Katsuragi et al.

(10) Patent No.: US 10,312,778 B2
(45) Date of Patent: Jun. 4, 2019

(54) STATOR OF ROTARY ELECTRIC MACHINE AND METHOD FOR MANUFACTURING SAME

(71) Applicant: Mitsubishi Electric Corporation, Tokyo (JP)

(72) Inventors: Kota Katsuragi, Tokyo (JP); Shogo Okamoto, Tokyo (JP); Tatsuro Hino, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 197 days.

(21) Appl. No.: 15/113,862

(22) PCT Filed: Apr. 4, 2014

(86) PCT No.: PCT/JP2014/059975
§ 371 (c)(1),
(2) Date: Jul. 25, 2016

(87) PCT Pub. No.: WO2015/151274
PCT Pub. Date: Oct. 8, 2015

(65) Prior Publication Data
US 2016/0344270 A1    Nov. 24, 2016

(51) Int. Cl.
H02K 1/06           (2006.01)
H02K 15/02          (2006.01)
(Continued)

(52) U.S. Cl.
CPC ........... *H02K 15/022* (2013.01); *H02K 1/148* (2013.01); *H02K 3/18* (2013.01); *H02K 3/521* (2013.01)

(58) Field of Classification Search
CPC ........... H02K 1/148; H02K 3/18; H02K 3/521
(Continued)

(56) References Cited
U.S. PATENT DOCUMENTS 7,679,255 B2 *   3/2010  Evans ................... H02K 1/148
                                                        310/216.066
2004/0113511 A1 *   6/2004  Schmidt ................. H02K 1/148
                                                        310/216.061
(Continued)

FOREIGN PATENT DOCUMENTS

CN      203219010 U     9/2013
JP      2002-359938 A   12/2002
(Continued)

OTHER PUBLICATIONS

English Translation of JP 2003-250252A, published on Sep. 5, 2003.
(Continued)

Primary Examiner — Hanh N Nguyen
(74) Attorney, Agent, or Firm — Sughrue Mion, PLLC; Richard C. Turner

(57) ABSTRACT

This stator includes: a plurality of divided core units 11a and 11b which respectively have: a plurality of annular divided cores 12a and 12b in each of which a plurality of tooth portions 13 are provided at a predetermined interval on the inner periphery of the corresponding one of annular back yoke portions 14 which are formed as a plurality of divided parts in the axial direction of the rotary electric machine; and a plurality of coils 15 respectively mounted to the tooth portions, wherein the plurality of divided core units are assembled in the axial direction such that the tooth portions thereof are coupled to each other via the annular back yoke portions.

7 Claims, 3 Drawing Sheets

(51) Int. Cl.
*H02K 1/14* (2006.01)
*H02K 3/18* (2006.01)
*H02K 3/52* (2006.01)

(58) Field of Classification Search
USPC .... 310/216.009, 216.025, 216.031, 216.029, 310/216.035
See application file for complete search history.

(56) References Cited

U.S. PATENT DOCUMENTS

2010/0109471 A1* 5/2010 Tellier .................... H02K 1/148
310/216.074
2015/0054377 A1* 2/2015 Kameyama ............ H02K 1/148
310/215

FOREIGN PATENT DOCUMENTS

JP 2003-250252 A 9/2003
JP 2013-158159 A 8/2013

OTHER PUBLICATIONS

Communication dated Jan. 19, 2018 from the State Intellectual Property Office of the P.R.C. in counterpart Application No. 201480076185.2.
International Search Report of PCT/JP2014/059975 dated Jun. 24, 2014 [PCT/ISA/210].
Communication dated Dec. 28, 2018, from the State Intellectual Property Office of People's Republic of China in counterpart Application No. 201480076185.2.
Communication dated Aug. 13, 2018 from the State Intellectual Property Office of the P.R.C. in counterpart Application No. 201480076185.2.

* cited by examiner

FIG. 6

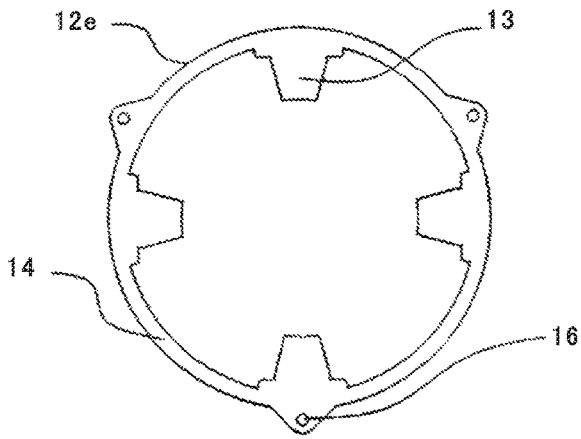

FIG. 7

| CREATE TWO ANNULAR DIVIDED CORES 12a AND 12b IN EACH OF WHICH SIX TOOTH PORTIONS 13 ARE PROVIDED AT PREDETERMINED POSITIONS WITH AN INTERVAL THEREBETWEEN ON THE INNER PERIPHERY OF THE CORRESPONDING ONE OF TWO ANNULAR BACK YOKE PORTIONS 14 WHICH ARE DIVIDED PARTS IN THE AXIAL DIRECTION OF THE ROTARY ELECTRIC MACHINE (FIRST STEP) | S1 |

↓

| CREATE TWO DIVIDED CORE UNITS 11a AND 11b BY MOUNTING A COIL 15 VIA AN INSULATOR TO EACH OF THE TOOTH PORTIONS 13 OF THE TWO ANNULAR DIVIDED CORES 12a AND 12b (SECOND STEP) | S2 |

↓

| INTEGRALLY ASSEMBLE TOGETHER, IN THE AXIAL DIRECTION, THE TWO DIVIDED CORE UNITS 11a AND 11b SUCH THAT THE TOOTH PORTIONS 13 OF THE TWO DIVIDED CORE UNITS 11a AND 11b ARE COUPLED TO EACH OTHER VIA THE ANNULAR BACK YOKE PORTIONS (THIRD STEP) | S3 |

STATOR OF ROTARY ELECTRIC MACHINE AND METHOD FOR MANUFACTURING SAME

CROSS REFERENCE TO RELATED APPLICATIONS

This application is a National Stage of International Application No. PCT/JP2014/059975, filed Apr. 4, 2014, the content of which are incorporated herein by reference in its entirety.

TECHNICAL FIELD

The present invention relates to a stator of a rotary electric machine and a method for manufacturing the same, and in particular, relates to a concentrated-winding stator having a divided core structure and a method for manufacturing the same.

BACKGROUND ART

In recent years, technological development of concentrated-winding-type rotary electric machines such as electric motors has been advanced mainly for attaining small sizes and high outputs.

The stator of an electric motor of this type is formed by assembling a plurality of divided cores into an annular shape and then by press-fitting or shrink-fitting the resultant assembly into a frame or a ring (for example, Patent Document 1).

CITATION LIST

Patent Document

Patent Document 1: Japanese Laid-Open Patent Publication No. 2013-158159

SUMMARY OF THE INVENTION

Problems to be Solved by the Invention

In the rotary electric machine of Patent Document 1, a plurality of divided cores assembled into an annular shape are shrink-fitted into a ring and thereby fixed.

Thus, the outer diameter of the rotary electric machine is increased by the thickness of the frame.

In addition, since the number of components is increased and a step of assembling the plurality of divided cores is required, costs for the product are increased.

In view of the above problems, an object of the present invention to provide, in a rotary electric machine that uses a concentrated-winding stator having a divided core structure, a stator of the rotary electric machine that allows reduction of the outer diameter and the weight and that allows reduction of the number of components and the number of steps, and a method for manufacturing the same.

Solution to the Problems

A stator of a rotary electric machine according to the present invention includes: a plurality of divided core units which respectively have: a plurality of annular divided cores in each of which a plurality of tooth portions are provided at a predetermined interval on an inner periphery of a corresponding one of annular back yoke portions which are formed as a plurality of divided parts in an axial direction of the rotary electric machine; and a plurality of coils respectively mounted via insulators to the tooth portions, wherein the plurality of divided core units are assembled together in the axial direction such that the tooth portions thereof are coupled to each other via the annular back yoke portions.

Effect of the Invention

According to the present invention, by adopting a frameless structure for a concentrated-winding stator having a divided core structure, the number of components and the number of steps can be reduced, Thus, the effect of reducing costs for the product can be attained, and the effect of reducing the outer diameter by the thickness of the frame and a stator of a rotary electric machine whose weight can be reduced by the weight of the frame can be realized.

In addition, due to the frameless structure, by expanding the annular back yoke portion by the thickness of the frame while maintaining the outer diameter of the stator, the effect of realizing high output of the rotary electric machine can be attained.

BRIEF DESCRIPTION OF THE DRAWINGS

FIG. 6 is a plan view showing an annular divided core according to embodiment 3 of the present invention.

FIG. 7 is an explanatory diagram showing the manufacturing steps of the stator of the rotary electric machine according to embodiment 1 of the present invention.

DESCRIPTION OF EMBODIMENTS

Embodiment 1

Figure 1:
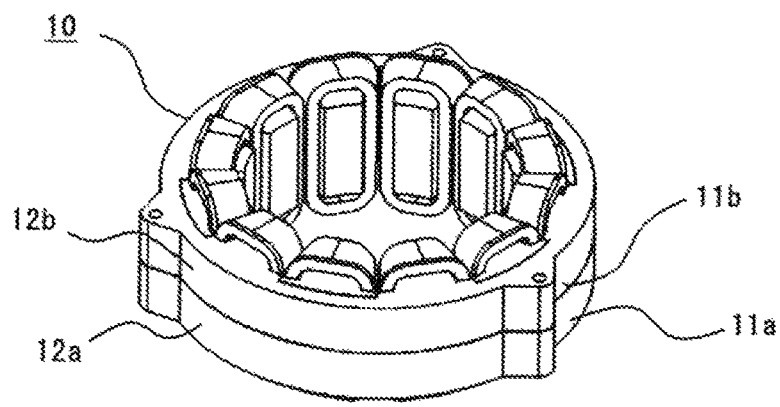
FIG. 1 is a perspective view showing a stator of a rotary electric machine according to embodiment 1 of the present invention.
Figure 2:
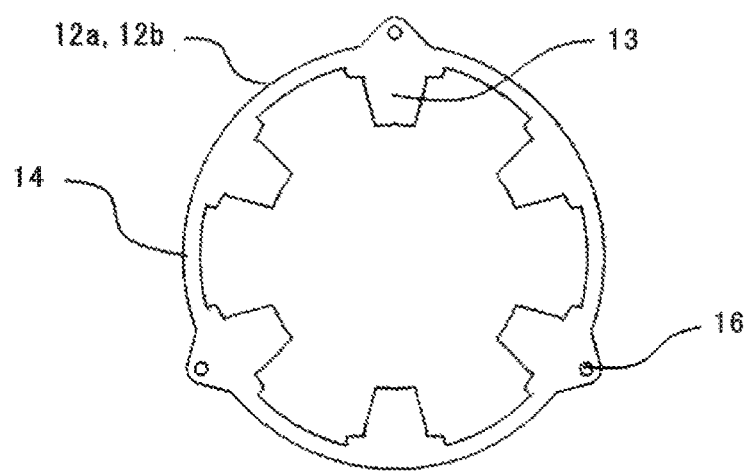
FIG. 2 is a plan view showing an annular divided core according to embodiment 1 of the present invention.
Figure 3:
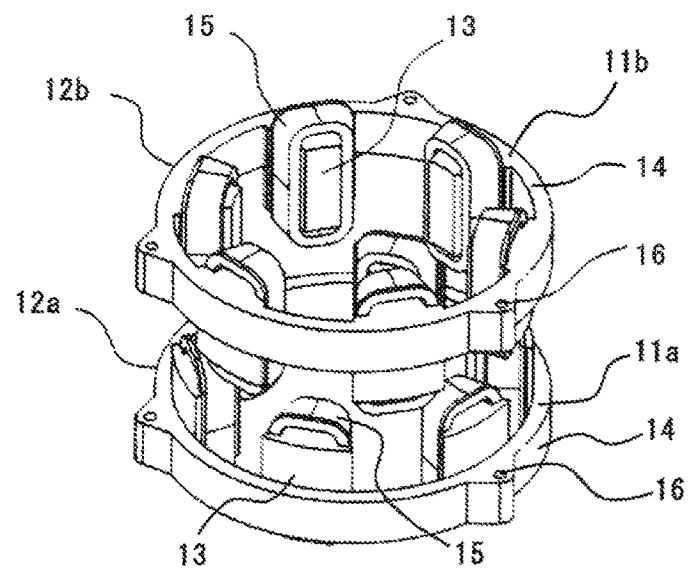
FIG. 3 is a perspective view showing divided, core units according to embodiment 1 of the present invention.

FIG. 1 is a perspective view showing a stator of a rotary electric machine according to embodiment 1 of the present invention. FIG. 2 is a plan view showing an annular divided core according to embodiment 1 of the present invention. FIG. 3 is a perspective view showing divided core units according to embodiment 1 of the present invention.

As shown in FIGS. 1 to 3, a stator 10 is composed of two divided core units 11a and 11b.

The divided core units 11a and 11b respectively have annular divided cores 12a and 12b which are formed as two divided parts in the axial direction of the rotary electric machine.

The annular divided core 12a, 12b is obtained, for example, by stacking, in the axial direction, thin plates stamped in a predetermined shape, so as to have a predetermined dimension. For the stamping, press working can be adopted.

The annular divided core 12a, 12b is composed of: a plurality of tooth portions 13 which are each a protrusion to which a coil 15 can be mounted; and an annular back yoke portion 14 which couples the tooth portions 13.

The annular divided core 12a, 12b includes six tooth portions 13 at an equal interval corresponding to substantially 60 degrees in the rotational direction.

The reference number 16 denotes a bolt hole used for mounting.

To each tooth portion 13 of the annular divided. cores 12a and 12b, a coil 15 which is a conductive wire previously formed into an annular shape is mounted via an insulating paper sheet (not shown) and an insulator (not shown), whereby the two divided core units 11a and 11b are formed.

In the divided core unit 11a, 11b, the insulating paper sheet (not shown) is fixed to both side surfaces in the circumferential direction of each tooth portion 13 by means of a double-sided tape, an adhesive, or the like.

The insulator (not shown) is provided to both end. surfaces in the axial direction of each tooth portion 13. To the tooth portion 13 insulated by the insulating paper sheet and the insulator, the coil 15 which is the conductive wire previously formed into an annular shape is mounted, and an insulating sheet covers the outer periphery of the coil 15 except both ends in the axial direction of the coil 15.

It is noted that the conductive wire may be directly wound around the tooth portion 13 insulated by the insulating paper sheet and the insulator.

In the present embodiment, the number of slots provided in the stator 10 is 12, but may be 6, 24, or the like. The number of slots may be any number that allows use of a wire connection method of connecting end portions of coils 15 wound around tooth portions 13 that are on opposite sides in the radial direction or that are not adjacent to each other.

As described above, in the present embodiment, the stator 10 is composed of the two divided core units 11a and 11b which are respectively composed of: the annular divided cores 12a and 12b; and the coils 15 respectively mounted to the tooth portions 13 thereof.

FIG. 7 shows a method for manufacturing the stator 10 in the present embodiment. First, two annular divided cores 12a and 12b are created in each of which six tooth. portions 13 are provided at predetermined positions with an interval therebetween on the inner periphery of the corresponding one of two annular back yoke portions 14 which are divided parts in the axial direction of the rotary electric machine (first step S1). Next, two divided core units 11a and 11b are created by mounting a coil 15 via an insulator to each of the tooth portions 13 of the two annular divided cores 12a and 12b (second step S2).

Further, the two divided core units 11a and 11b are integrally assembled together in the axial direction by press-fitting, to the inner diameter side of the annular back yoke portion 14 of one divided core unit 11a, the outer diameter side of each tooth portion 13 of the other divided. core unit 11b, so that the tooth portions 13 of the two divided core units 11a and 11b are coupled to each other via the annular back yoke portions (third step S3).

The assembling of the two divided core units 11a and 11b in the third step S3 may be performed by a method of shrink-fitting, welding, bonding, or the like, other than the press-fitting.

As the method for creating each of the two annular divided cores 12a and 12b in the first step, a method can be adopted in which: thin plates stamped so as to correspond to the shapes and the dimensions of the annular back yoke portion and the tooth portions are stacked by a predetermined thickness in the axial direction, and then, to the member obtained through the stacking, members obtained by stacking thin plates stamped so as to correspond to the shape and the dimensions of only the tooth portions are added by being fixed by a necessary length by bonding, swaging, or the like.

As another method, a method can be adopted in which: thin plates stamped so as to correspond to the shape and the dimensions of the annular back yoke portion are stacked by a predetermined thickness and, separately, plates stamped so as to correspond to the shape and the dimensions of each tooth portion are stacked by a predetermined thickness, and then, each tooth portion obtained through the stacking is integrally fixed at a predetermined position of its corresponding annular back yoke portion obtained through the stacking, by bonding, swaging, or the like.

As described above, the stator 10 of the rotary electric machine according to embodiment 1 includes two divided core units 11a and 11b which respectively have: two divided core units 11a and 11b in each of which six tooth portions 13 are provided at a predetermined interval on the inner periphery of the corresponding one of annular back yoke portions 14 which are formed as two divided parts in the axial direction of the rotary electric machine; and the coils 15 respectively mounted, via insulators, to the tooth portions 13 of the annular divided cores 12a and 12b, wherein the two divided core units 11a and 11b are assembled. together in the axial direction such that the tooth portions 13 thereof are coupled to each other via the annular back yoke portions 14.

With this configuration, a step of arraying divided cores into an annular shape and a frame for fixing the divided cores arrayed in the annular shape, which have been conventionally required, are no longer required, and the number of steps and the number of components can be reduced. Accordingly, costs for the product can be reduced.

In addition, since the frame is not required, the outer diameter of the stator can be reduced by the thickness of the frame, and thus, the size and the weight of the product can be reduced.

Moreover, by expanding the annular back yoke portion by the thickness of the frame while maintaining the conventional outer diameter, high output of the product can be attained.

Embodiment 2

Figure 4:
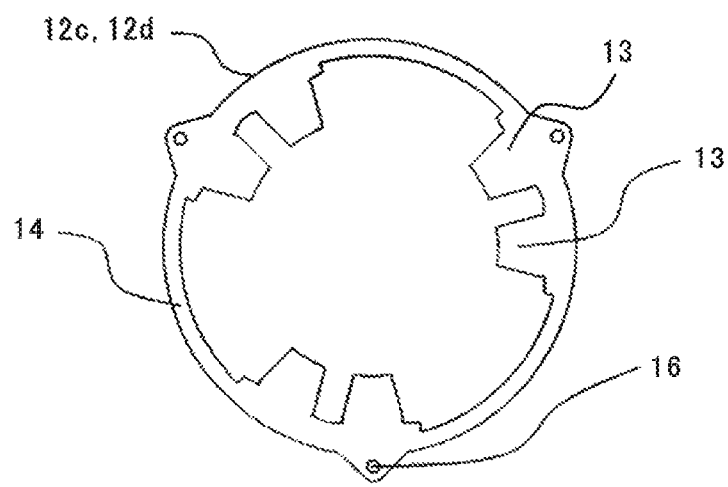
FIG. 4 is a plan view showing an annular divided core according to embodiment 2 of the present invention.
Figure 5:
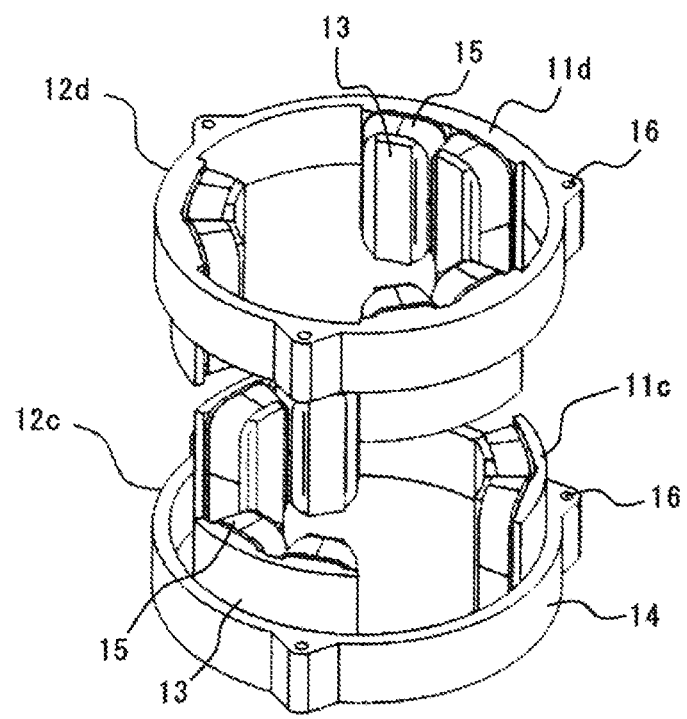
FIG. 5 is a perspective view showing divided core units according to embodiment 2 of the present invention.

FIG. 4 is a plan view showing an annular divided core according to embodiment 2 of the present invention. FIG. 5 is a perspective view showing divided core units according to embodiment 2 of the present invention. The configurations of the parts not specifically described in the present embodiment are the same as those of embodiment 1.

In the present embodiment 2, as shown in FIG. 4, each of two annular divided cores 12c and 12d includes six tooth portions 13 which are provided two by two adjacently at an equal interval corresponding to substantially 120 degrees in the rotational direction.

Then, as shown in FIG. 5, the coil 15 is mounted via an insulator to each of the tooth portions 13 of the two annular divided cores 12c and 12d, to form two divided core units 11c and 11d, and the two divided core units 11a and 11b are assembled together in the axial direction such that the tooth portions 13 thereof are coupled together via the annular back yoke portions 14.

It is noted that the number of tooth portions 13 adjacent to each other in each annular divided core 12c, 12d may be a number other than two.

Embodiment 3

FIG. 6 is a plan view showing an annular divided core 12e according to embodiment 3 of the present invention. The configurations of the parts not specifically described in the present embodiment are the same as those of embodiment 1.

In the present embodiment 3, an example is shown in which the stator 10 is composed of annular divided cores which are three divided parts in the axial direction.

FIG. 6 shows the annular divided core 12e which is one of the three annular divided cores, and the annular divided core 12e includes four tooth portions 13 at an equal interval corresponding to substantially 90 degrees in the rotational direction.

By increasing the number of divisions of the core, the interval between the tooth portions 13 in each annular divided, core 12e is increased. This facilitates assembling of the coil 15, the insulating paper sheet, the insulator, and the like, and thus, costs for the product can be reduced.

It is noted that the number of the annular divided cores forming the stator 10 may be three or greater.

It is noted that, within the scope of the present invention, the above embodiments may be freely combined with each other, or each of the above embodiments may be modified or omitted as appropriate.

DESCRIPTION OF THE REFERENCE CHARACTERS

10 stator
11a, 11b, 11c, 11d divided core unit
12a, 12h, 12c, 12d, 12e annular divided core
13 tooth portion
14 annular back yoke portion
15 coil
16 bolt hole

The invention claimed is:

1. A stator of a rotary electric machine, the stator comprising:
   a plurality of divided core units which respectively have: a plurality of annular divided cores in each of which a plurality of tooth portions are provided on an inner periphery of a corresponding one of annular back yoke portions which are formed as a plurality of divided parts in an axial direction of the rotary electric machine; and a plurality of coils respectively mounted to the tooth portions, wherein
   the plurality of divided core units are assembled together in the axial direction such that the tooth portions thereof are coupled to each other via the annular back yoke portions, and
   two of the plurality of tooth portions on each annular divided core are disposed adjacent to each other.

2. The stator of the rotary electric machine according to claim 1, wherein
   the number of the annular divided cores is three or greater.

3. The stator of the rotary electric machine according to claim 1, wherein
   the coils of each divided core unit are mounted via insulators to the tooth portions, respectively.

4. A method for manufacturing a stator of a rotary electric machine, the method comprising:
   a first step of creating a plurality of annular divided cores in each of which a plurality of tooth portions are provided at predetermined positions on an inner periphery of a corresponding one of a plurality of annular back yoke portions which are divided parts in an axial direction of the rotary electric machine;
   a second step of creating a plurality of divided core units by mounting a coil to each of the tooth portions of the plurality of annular divided cores; and
   a third step of integrally assembling together, in the axial direction, the plurality of divided core units such that the tooth portions of the plurality of divided core units are coupled to each other via the annular back yoke portions,
   wherein two of the plurality of tooth portions on each annular divided core are disposed adjacent to each other.

5. The method for manufacturing the stator of the rotary electric machine according to claim 4, wherein
   in the third step, the plurality of divided core units are integrally assembled together by fixing, to an inner diameter side of each of the annular back yoke portions, an outer diameter side of each tooth portion of another divided core unit by press-fitting, shrink-fitting, welding, or bonding.

6. The method for manufacturing the stator of the rotary electric machine according to claim 4, wherein
   in the first step, each annular divided core is created by stacking, in the axial direction, thin plates stamped so as to correspond to shapes and dimensions of the annular back yoke portion and the tooth portions, and then fixing and adding, to the member obtained through the stacking, members obtained by stacking thin plates stamped so as to correspond to the shape and the dimensions of only the tooth portions.

7. The method for manufacturing the stator of the rotary electric machine according to claim 4, wherein
   in the first step, each annular divided core is created by stacking thin plates stamped so as to correspond to the shape and the dimensions of the annular back yoke portion, and separately stacking thin plates stamped so as to correspond to the shape and the dimensions of each tooth portion, and then, by integrally fixing each tooth portion obtained through the stacking at a predetermined position of a corresponding annular back yoke portion obtained through the stacking.

* * * * *